(12) United States Patent
Jackel (10) Patent No.: US 6,207,949 B1
(45) Date of Patent: Mar. 27, 2001

(54) METHOD AND APPARATUS FOR STABILIZING ATTENUATORS IN OPTICAL NETWORKS

(75) Inventor: Janet L. Jackel, Holmdel, NJ (US)

(73) Assignee: Telcordia Technologies, Inc., Morristown, NJ (US)

(*) Notice: Subject to any disclaimer, the term of this patent is extended or adjusted under 35 U.S.C. 154(b) by 0 days.

(21) Appl. No.: 09/437,838

(22) Filed: Nov. 10, 1999

(51) Int. Cl.$^7$ .................................................. G02B 6/26
(52) U.S. Cl. ............................ 250/227.24; 250/214 R; 455/249.1
(58) Field of Search ....................... 250/227.24, 227.11, 250/227.21, 214 R, 214 AG; 359/177, 181; 455/249.1, 242.2, 68, 69, 70; 327/308, 309, 315, 318, 319

(56) References Cited

U.S. PATENT DOCUMENTS 5,457,811 * 10/1995 Lemson .......................... 455/67.1

OTHER PUBLICATIONS

I. Roudas et al., "Transient effects in wavelength add–drop multiplexer chains" Conference Proceedings of the Optical Fiber Communication Conference (OFC) & International Conference on Integrated Optics & Optical Fiber Comm. (IOOC), TUR1–1, pp. 246–248, 1999. (Month Unknown).

* cited by examiner

*Primary Examiner*—Que T. Le
(74) *Attorney, Agent, or Firm*—Joseph Giordano; Orville R. Cockings (57) ABSTRACT

A methodology and concomitant circuitry wherein an optical attenuator, having a range of settings including a minimum attenuation, is set to a pre-selected value less than the minimum attenuation whenever a loss of incoming signal power is detected in an optical path coupled to the attenuator.

24 Claims, 5 Drawing Sheets

METHOD AND APPARATUS FOR STABILIZING ATTENUATORS IN OPTICAL NETWORKS

BACKGROUND OF THE DISCLOSURE

1. Field of the Invention

This invention relates generally to optical communications networks, and, more particularly, to methodologies and concomitant circuitry for mitigating transient effects in the networks caused by attenuator adjustments which compensate for signal power changes.

2. Description of the Background

Recent research advances in optical Wavelength Division Multiplexing (WDM) technology have fostered the exploratory development of optical networks that are orders of magnitude higher in transmission bandwidth than existing commercial networks. While such an increase in throughput is impressive on its own, a corresponding decrease in network latency can also be achieved in the same networks. Thus, it is clear that the Next Generation Internet (NGI) vision of providing ultra high-speed networks that can meet the requirements for supporting new applications, including national initiatives, is indeed feasible.

However, in both commercial networks and exploratory networks, network reconfigurations, failures, protection switching, and even the fact that not all signals originate at the same point in the optical network (that is, a network element may drop an incoming signal for delivery to a destination device, or may add an incoming signal from a source device onto the optical network) may cause abrupt changes of the power levels of the signals propagating in such optical networks; to fully realize the benefits of the NGI applications, there are potentially deleterious effects to overcome because of such power-changing mechanisms.

First, since network elements contain optical amplifiers, it is known that if the power in a given wavelength serving as the input to an amplifier is large relative to the power in other incoming wavelengths, the dominant wavelength is emitted with more power than the other wavelengths and the power in each of the other wavelengths is reduced. This dominance by the given wavelength causes unequal signal-to-noise ratios for the signals propagated by the wavelengths which, in turn, can cause system degradation. To compensate for such incoming power variations in a conventional arrangement, a servo-controlled attenuator is inserted before each amplifier to serve as a power equalizer. In particular, an optical attenuator is interposed in the path of the incoming signal for each wavelength, and the attenuator's setting is a value that is based upon the history of the optical power that has entered the attenuator. In normal operation, the attenuator settles to an equilibrium state wherein the setting is typically a mid-range value (in the range between a maximum attenuation and a minimum attenuation) based upon desired network operating characteristics, such as the necessary signal-to-noise ratio. To achieve the equilibrium state, the power in the incoming signal is measured and then compared to a "comparison value", which is also selected in view of the network operating characteristics. Then, if the incoming power is too high relative to the comparison value, the attenuation can be increased to offset the high power signal; conversely, the attenuation can be decreased to increase the signal serving as the network element's input. In the extreme case of no measurable input power, the attenuator is set to a mode whereby no attenuation ("no attenuation" mode for later reference) is provided by the attenuator.

Power fluctuations are typically measurable at the input or output of the servo-controlled attenuators. Servo-controlled attenuators exhibit transient settling times before compensating for the power fluctuations and reaching equilibrium; moreover, depending upon their design, such settling times can be long relative to the time constants of other components in the optical network. During the settling time, system performance may be degraded, so an objective in the provision of a power-correcting attenuator network is the minimization of such settling time.

Second, it is also known that the activity of compensating for power fluctuations in a given wavelength by an upstream attenuator impacts on the operation of downstream attenuators and can induce transient settling times in the downstream attenuators. As before, during periods of adjustment, a given wavelength may predominate at a downstream amplifier, and S/N can be degraded. Thus, power fluctuations in an upstream link can cause a "rippling effect" in downstream network elements, and must be mitigated to maintain system performance.

Third, transient conditions caused by power variations of one wavelength channel can even be coupled to other wavelength channels due to the cross-saturation effects of an amplifier; this is especially true if the amplifier is an Erbium-doped fiber amplifier (EDFA) which is not gain-clamped—such EDFAs are typically used in present-day optical networks. This mechanism can be responsible for sustained power fluctuations in large scale optical networks composed of closed loops. Such a network transient response depends upon the magnitude of the initial power perturbation, the speed of the servo-controlled attenuators, the design of the EDFAs, the network topology, and the add/drop characteristics of the network elements, as well as the interactions of the foregoing mechanisms and components.

It is now understood in the art that elimination of coupling between wavelength channels can be achieved by using gain-clamped EDFAs or fast servo-controlled attenuators, that is, attenuators that have response times which are an order of magnitude faster (in the range of 10–100 microseconds) than the corresponding amplifiers (about 1 millisecond).

An article fully discussing the effects of transients induced by the operation of conventional servo-controlled attenuators is published in the Conference Proceedings of the Optical Fiber Communication Conference (OFC) and International Conference on Integrated Optics and Optical Fiber Communication (IOOC), TuR1-1, pgs. 246–248, 1999, and is entitled "Transient Effects in Wavelength Add-Drop Multiplexer Chains".

However, because of the high bit-rate signals in an optical network, even fast-operating attenuators operating in aforementioned speed range will not preclude degraded S/N ratios during the adjustment time, either in a given attenuator or in the downstream attenuators impacted by the transient effects of the given upstream attenuator. The prior art is devoid of teachings or suggestions relating to mitigation of transient oscillations caused by attenuators during periods in which an attenuator is adjusting for shifts in incoming power.

SUMMARY OF THE INVENTION

Shortcomings and limitations of the prior art are obviated, in accordance with the present invention, by a methodology and concomitant circuitry wherein an attenuator is set to a pre-selected value, rather than the "no attenuation" mode, whenever a loss of incoming signal power is detected.

Broadly, in accordance with one method aspect of the present invention, a method for controlling an optical attenuator disposed in optical path propagating an optical signal, the attenuator having a range of settings including a minimum attenuation, wherein the method includes: (a) measuring energy in the optical signal at the attenuator, and (b) setting the attenuator to a pre-selected value whenever the energy is below a pre-determined threshold indicative no optical signal, the pre-selected value being less than the minimum attenuation.

Broadly, in accordance with one system aspect of the present invention, circuitry for controlling an optical attenuator disposed in optical path propagating an optical signal, the attenuator having settings having a range of settings including a minimum attenuation, wherein the circuitry includes: (a) a detector for detecting energy n the optical signal at the attenuator, and (b) a signal processor, responsive to the detector, for setting the attenuator to a pre-selected value whenever the energy is below a pre-determined threshold indicative no optical signal, the pre-selected value being less than the minimum attenuation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

To fully appreciate the import of the signal processing system of the present invention, as well as to gain an appreciation for the underlying operational principles of the present invention, it is instructive to first present, in quantitative fashion, two heuristic examples of the effects of attenuator settling times on power levels within a segment of an optical network. This overview also serves to introduce terminology so as to facilitate the more detailed description of an illustrative embodiment in accordance with the present invention. Following these motivating examples, a description of the illustrative embodiment is then elucidated.

HEURISTIC EXAMPLES

Example 1

Conventional Operation of Attenuators

Figure 1:
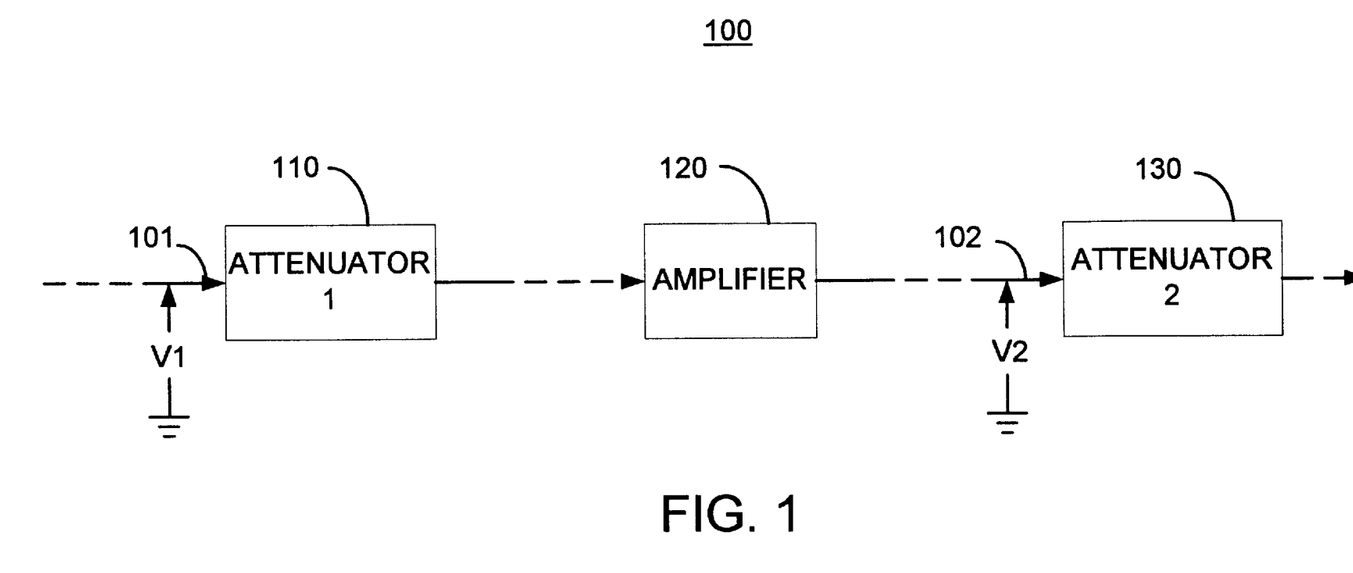
FIG. 1 depicts, in high-level block diagram form, a sub-network of a conventional optical system, the sub-network including a cascade of a first attenuator, an associated amplifier, and a downstream attenuator.

With reference to FIG. 1, there is shown sub-network 100 of an optical network, with sub-network 100 being composed, in cascade, of: (a) first attenuator 110 having as its input an optical signal at a given wavelength propagating on fiber 101; (b) amplifier 120 being coupled to attenuator 10 and outputting an optical signal at the given wavelength on fiber 102; and (c) second, downstream attenuator 130 having as its input an optical signal at the given wavelength propagating on optical fiber 102. For purposes of the immediate discussion, it is assumed that a measure of the optical power at the input to attenuators 110 and 130, respectively, is available in terms of an electrical voltage; in FIG. 1, this measure is shown as V1 for attenuator 110 and as V2 for attenuator 130. (Such a measure may be effected, for example, by tapping the optical signal from the input of each attenuator, and passing the tapped signal through an optical-to-electrical converter).

With reference to FIGS. 2A–2D, there is shown a sequence of four related figures. To arrive at the following figures, certain assumptions with respect to response times have been made for sake of clarity, but without loss of generality. In particular, rise times and fall times of signals have been idealized. Also, because any practical attenuator has a finite response time, the response cannot be instantaneous—the response time of the attenuator is assumed to be a constant, designated Tr. Thus, once an event is detected requiring a change in the setting of an attenuator, the time for the attenuator to respond is Tr. Such a response time is due to, for instance, mechanical movement of certain types of servo-controlled attenuators or time required for the generation of a servo-control signal.

The plots of FIGS. 2A–2D are described as follows:

(i) in FIG. 2A, the voltage V1 is plotted versus time for a signal propagation scenario as follows: the signal at the given wavelength propagates at a normalized value of 1.0 (V1=1.0) up to time Toff; at Toff, the propagating signal disappears (V1=0.0), say due to a reconfiguration activity in the network, and the signal remains off until the time Ton; at Ton, signal power restored at a normalized value V1=1.0.

(ii) in FIG. 2B, the settings for attenuator 110 are plotted versus time for the time events of FIG. 2A, as follows: at time t=0, the setting on attenuator 110 has achieved an equilibrium state, with a concomitant attenuator setting which a normalized basis is presumed to be 0.5. Attenuator 110 fully attenuates when the setting is 0.0, and provides no attenuation for a setting of 1.0. At time Toff, V1 drops to 0.0, and attenuator 110 must respond to this change, with the response time Tr in FIG. 2B. Because there is no measurable power in the incoming optical signal (i.e., V1=0.0), the attenuator is adjusted for minimum attenuation, or a setting of 1.0. At time Ton, power restored in the incoming optical signal at the normalized level, so attenuator 110 readjusts to the equilibrium state having a setting of 0.5. However, a response time of Tr is again required before attenuator 110 fully compensates for the increased power. During the time period (Ton, Ton+Tr), the power to amplifier 120 is larger than desired, and the effects discussed the Background can occur, including degraded S/N ratio and reduced power in other incoming wavelengths.

Figure 2A:
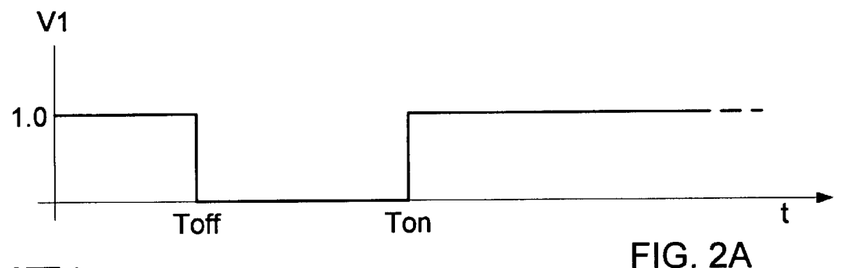
FIGS. 2A–2D are time plots of certain signals in the sub-network of FIG. 1 based upon the conventional operation of the attenuators.
Figure 2B:
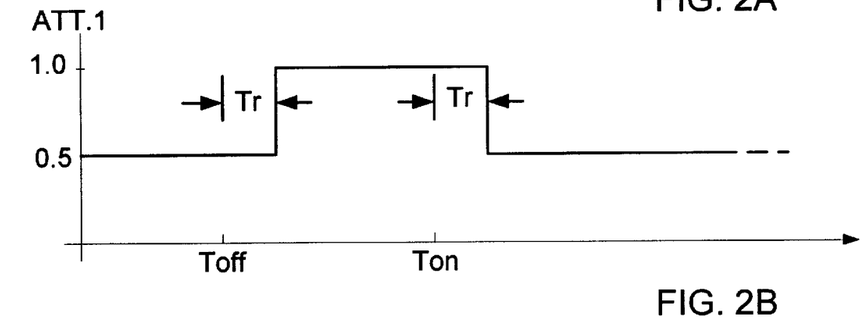
Figure 2C:
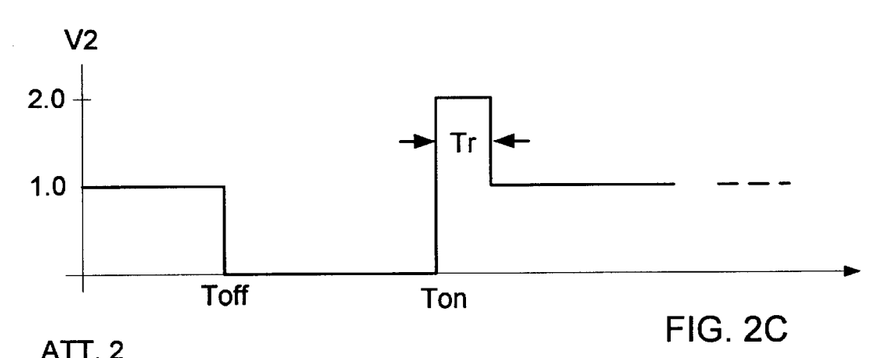

(iii) in FIG. 2C, V2 is plotted versus time for the time periods of FIGS. 2A and 2B. To arrive at the plot of this figure, it is assumed that amplifier 120 provides the incoming signal with a 3 dB gain. Thus, for the time interval up to Toff, V2 has a normalized value of 1.0, as expected for the system operating properly in steady-state. From Toff to Ton, V2=0.0, since power in the signal is lost upstream, and even the removal of attenuation by attenuator 110 and amplification by amplifier 120 cannot overcome no incoming power. During the period (Ton, Ton+Tr), the signal emitted by attenuator 110 is 1.0, and after amplification by amplifier 120, the normalized signal is such that V2=2.0. Once attenuator 10 responds, then the normalized signal V2 reduces to 1.0 at Ton+Tr.

Figure 2D:
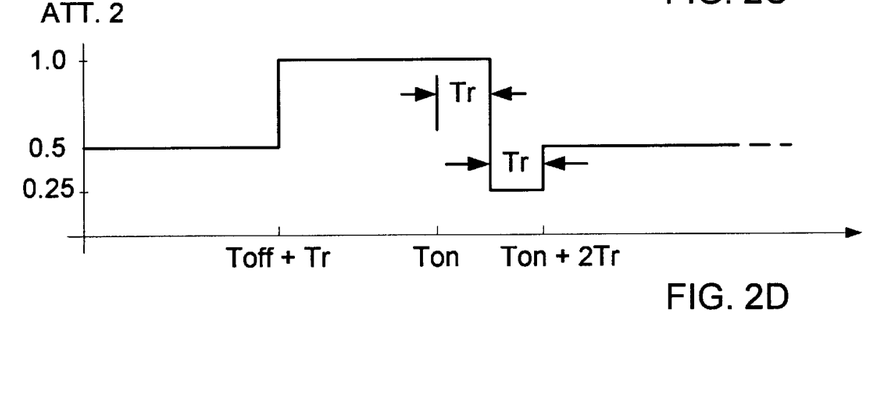

(iv) in FIG. 2D, the settings for attenuator 130 are plotted versus time for the time events of FIG. 2A–2C, as follows: up to Toff, the setting is the equilibrium state having a concomitant attenuator setting of 0.5. Once V2 drops to zero, attenuator 130 responds with a setting of 1.0, but with a response time of Tr. During the period (Ton, Ton+Tr), the signal emitted by attenuator 110 is 1.0, and after amplification by amplifier 120, the signal V2=2.0. Because this signal emitted by attenuator 130 should be 0.5, attenuator 130 adjusts to a setting of 0.25. However, the response time is Tr, so the effect of the adjustment does not occur until Ton+Tr. By this time, attenuator 110 has reduced the incoming power to the equilibrium state, so attenuator 130 is overcompensating at time Ton+Tr. Attenuator 130 effects a final adjustment by setting a value of 0.5, but the full effect of the adjustment does not take place until Ton+2 Tr. During the time interval (Ton, Ton+2 Tr), the deleterious transient effects of unequal power on incoming signals exist.

Example 2

Operation of Attenuators in Accordance With Present Invention

Again by way of motivation, the example discussed with respect to FIGS. 2A–2D is now recast in FIGS. 3A–3D to elucidate the principles of the present invention. The same assumptions regarding idealizations of time waveforms used to present the plots of FIGS. 2A–2D are used for FIGS. 3A–3D. The essential difference between the plots is as follows: whenever no signal is present as measured by V1 or V2, rather that set attenuators 110 or 130 to the "no attenuation" setting (i.e., 1.0), each attenuator is set to a pre-selected value. The pre-selected value is based upon system considerations and engineering judgments.

Figure 3A:
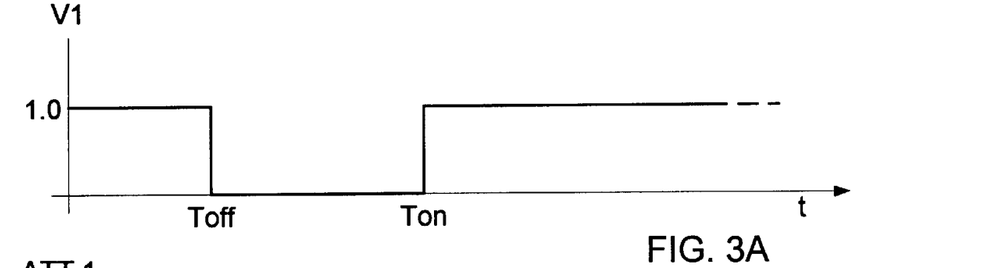
FIGS. 3A–3D are time plots, corresponding to the time plots of FIGS. 2A–2D, depicting the same signals of FIG. 2 but based upon the operation of the attenuators in accordance with the present invention.

The plots of FIG. 3A–3D are described as follows:

(i) FIG. 3A is FIG. 2A repeated for reference purposes.

(ii) in FIG. 3B, the settings for attenuator 110 are plotted versus time for the time vents of FIG. 3A, as follows: at time t=0, attenuator 110 is set to the equilibrium state having an associated attenuator setting which on a normalized basis is presumed to be 0.5. At time Toff, V1 drops to 0.0, and the attenuator must respond to this change, with the response time Tr in FIG. 3B. Because there is no measurable power in the incoming optical signal (i.e., V1=0.0), attenuator 110 is adjusted for the "no incoming signal" condition—in this case, however, a pre-selected value of 0.75 is chosen for the attenuator setting. At time Ton, power is restored in the incoming optical signal at the normalized level, so attenuator 110 is readjusts to the equilibrium state wherein the attenuator is set to a value of 0.5. However, a response time of Tr is again required before attenuator 110 fully compensates for the increased power. During the time period (Ton, Ton+Tr), the power to amplifier 120 is larger than desired, but the normalized signal from attenuator 110 is 0.75, not the 1.0 value of FIG. 2B, so the dominance of the given wavelength is less-pronounced.

Figure 3B:
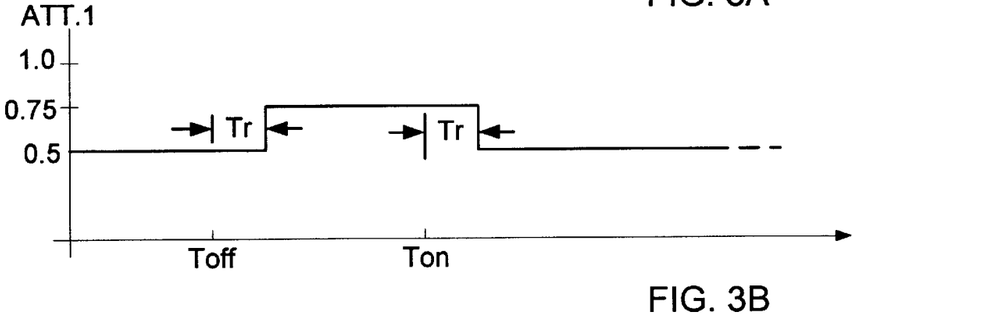
Figure 3C:
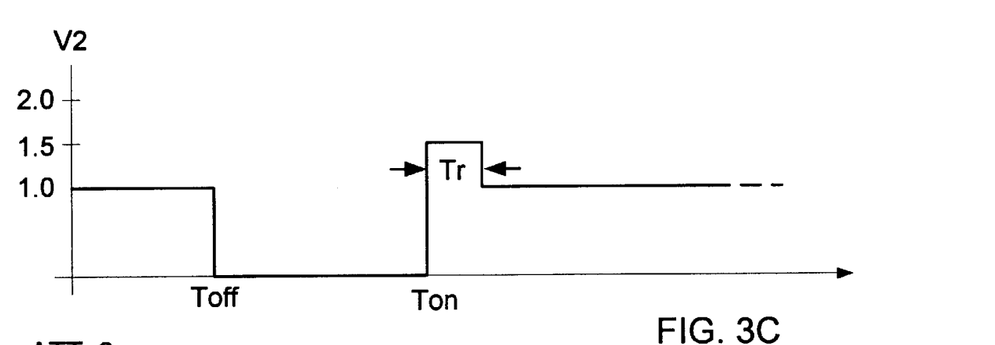

(iii) in FIG. 3C, V2 is plotted versus time for the time periods of FIGS. 3A and 3B. To obtain this plot, it is assumed that amplifier 120 amplifies the provides a 3 dB gain to the incoming signal. Thus, for the time interval up to Toff, V2 has a normalized value of 1.0, as expected steady-state system operation. From Toff to Ton, V2=0.0, since power in the signal is lost upstream, and even a setting of 0.75 for attenuator 110 and amplification by amplifier 120 cannot overcome no incoming power. During the period (Ton, Ton+Tr), the signal emitted by attenuator 110 is 0.75, and after amplification by amplifier 120, the normalized signal is such that V2=1.5. Once attenuator 110 completes its compensation, then V2=1.0 for time>(Ton+Tr).

Figure 3D:
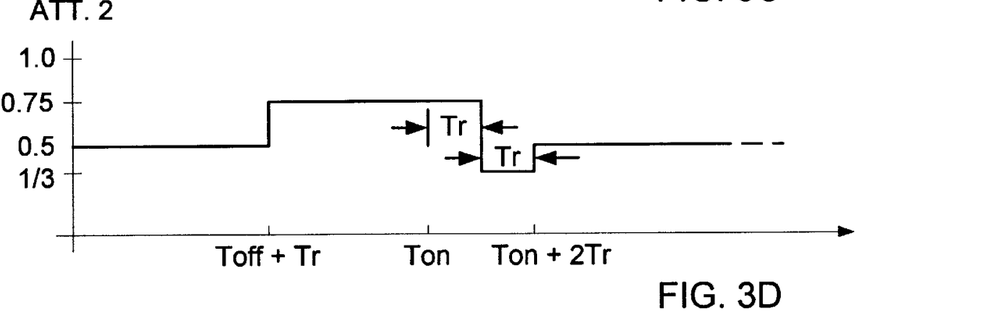

(iv) in FIG. 3D, the settings for attenuator 130 are plotted versus time for the events of FIG. 3A–3C, as follows: at Toff, attenuator 130 adjusts to the "no signal" condition with the pre-selected setting of 0.75. At Ton, attenuator 130 adjusts to a setting of ⅓ to reduce the value of V2 to 0.5, but the response time is Tr. At Ton+Tr, V2=1.0, so attenuator 130 adjusts to a final value of 0.5, with compensation being completed by Ton+2 Tr. Again, during the time interval (Ton, Ton+2 Tr), the deleterious transient effects of unequal power exist. But, the variations are not as pronounced as in the example conveyed by FIGS. 2A–2D, so system degradation is reduced.

In the motivating example of FIGS. 3A–3D, it can be readily appreciated that as the pre-selected value converges to the value representative of the equilibrium state, power variations due to changing settings are mitigated, Thus, as the pre-selected value approaches, in the limit, the value representative of the equilibrium state from above or below, there are no deleterious effects because no changes are required in the settings on the attenuators, and hence no required settling times.

Illustrative Embodiment

As readily discerned from the foregoing examples, the subject matter in accordance with the present invention covers a modification to the arrangement and operation of a conventional optical attenuator such as attenuator 110 or 130 of FIG. 1. In the following description, those aspects of the conventional operation that are pertinent to the inventive subject matter are reviewed so as to convey a complete understanding of the principles of the present invention. To this end, a high-level block diagram which encompasses both a conventional attenuator-adjusting arrangement as well as the inventive adjusting-arrangement is shown in FIG. 4; the primary difference between the conventional arrangement and the arrangement in accordance with the present invention is the signal processing carried out by attenuator processor 440 of FIG. 4, as discussed in detail below.

Figure 4:
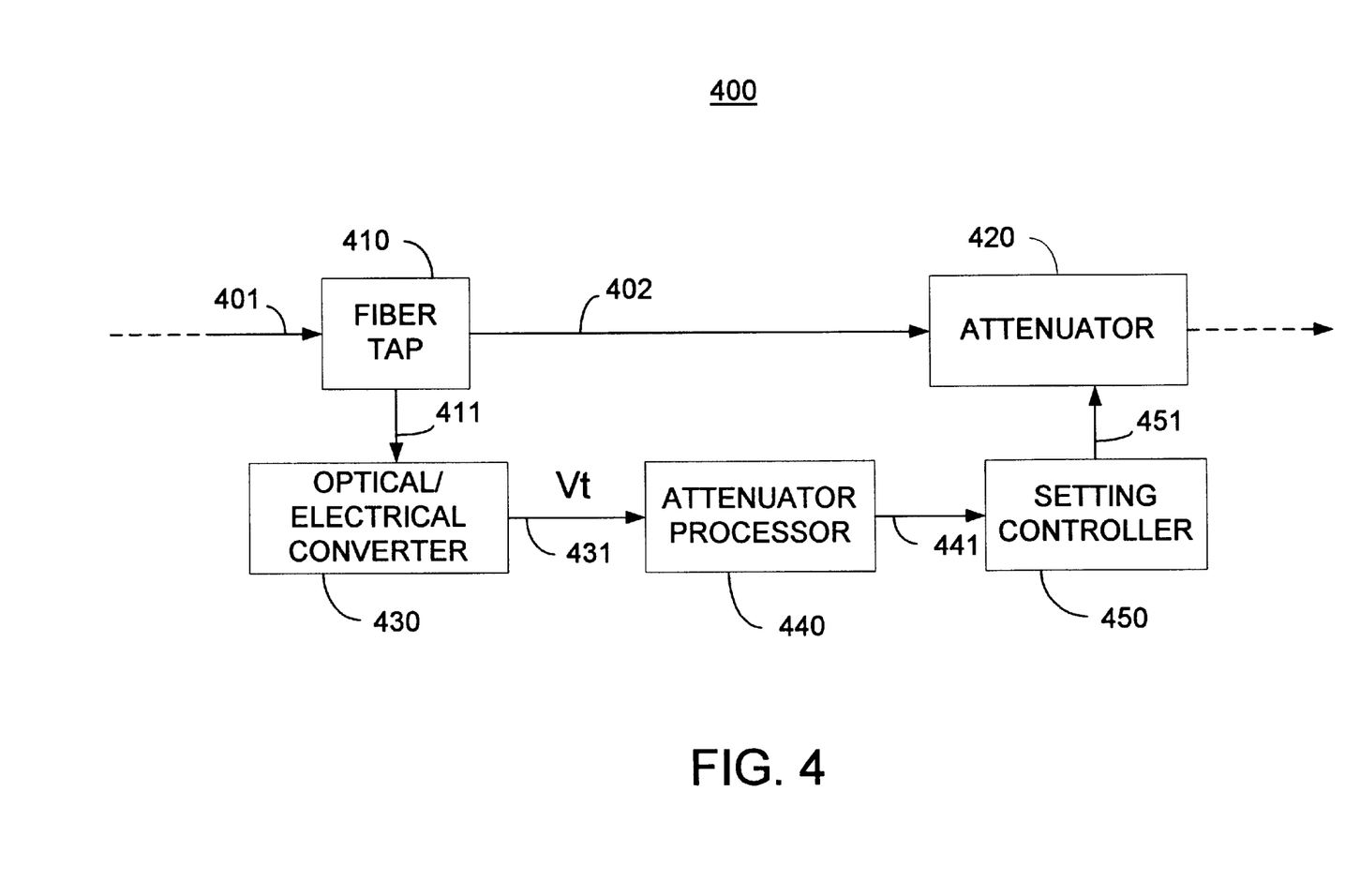
FIG. 4 is illustrative of an attenuator arrangement wherein an tapped optical signal is processed to produce the control signal for the attenuator.

With reference to FIG. 4, there is shown sub-network 400 of an optical network composed of: (a) attenuator 420; (b) fiber tap 410 for tapping off a portion of the energy from optical fiber 401, with the main portion of the energy being delivered to attenuator 420 via path 402, and the tapped portion of the energy being emitted on path 411; (c) optical/electrical converter 430 having path 411 as an input; (d) attenuator processor 440 being coupled to converter 430 via path 431; and (e) setting controller 450 having the output of processor 440 as its input, via path 441, and providing its output to attenuator 420 via path 451. Converter 430 has the two-fold function of: (i) converting optical energy at a given wavelength to electrical energy; and (ii) converting the electrical energy to a quantity indicative of the energy in the given wavelength, that is, providing a measurable quantity to processor 440. For example, such a measurable quantity may be a voltage, which is referred to as Vt and appears on path 431.

Conventionally, processor 440 utilizes a comparison voltage, designated Vc, for comparison to Vt (Vc is, for example, the value of voltage associated with the equilibrium state for attenuator 420). If Vt<Vc, then the power level in the optical signal on fiber 401 must be increased at the output of attenuator 420, so the setting of attenuator 420 is adjusted to decrease the attenuation. In operation, the result of the comparison is delivered to controller 450, and an attenuator control signal commensurate with the comparison is delivered by controller 450 to attenuator 420. In a similar manner, if Vt>Vc, then the power level in the signal on fiber 401 is decreased via the operation of processor 440 in conjunction with controller 450. In the extreme case of loss of signal power, then the former case applies, that is, Vt<Vc, and controller 450 removes all attenuation from attenuator 420. The plots of FIGS. 2A–2D exemplified the operation of sub-network 400 in this extreme condition and, moreover, covered the various other operating alternatives of: steady-state operation (up to Toff); loss of power (Toff to Ton); and recovery after loss of power to re-capture steady-state (time greater than Ton). By way of terminology, the foregoing operation of circuitry 400 of FIG. 4 is called the "conventional operation" of attenuator 420.

Figure 5:
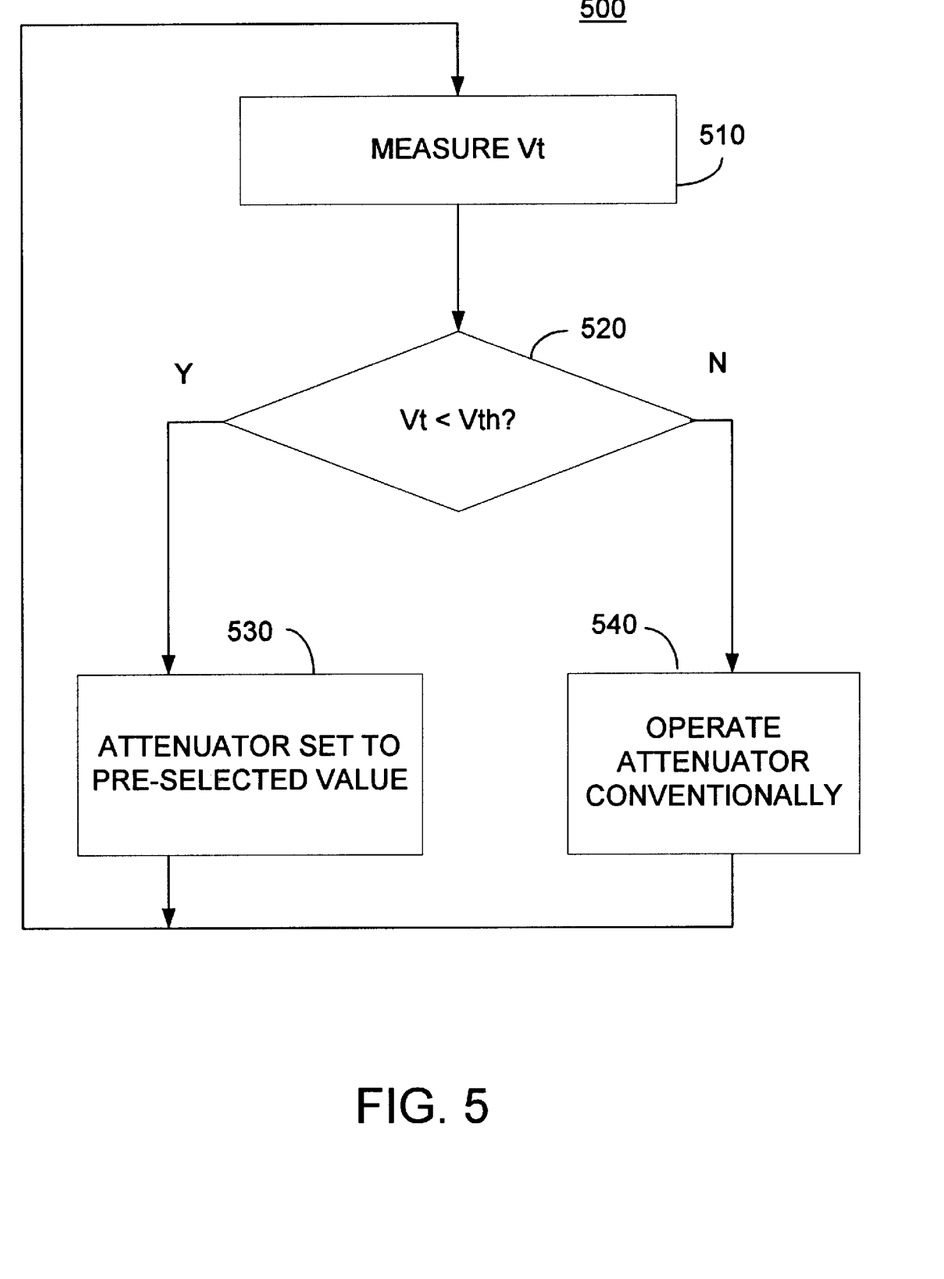
FIG. 5 is a flow diagram for the attenuator processor of FIG. 4.

As already alluded to, the operation of circuitry 400 in accordance with the present invention is engendered by the signal processing of processor 440, which is now discussed with respect to flow diagram 500 of FIG. 5. In FIG. 5, processing by block 510 provides the measurable quantity Vt. Next, decision block 520 is invoked to determine if Vt is less than a threshold voltage, designated Vth. Vth is selected according to network operating characteristics; for example, Vth may be set to a value that is 10 db below the lowest expected power in an incoming optical signal. If Vt>Vth, then the "conventional operation" of attenuator 420 is effected, as evidenced by processing block 540. On the other hand, if Vt<Vth, then processing by block 530 is invoked to set attenuator 530 to a pre-scribed value. The plots of FIGS. 3A–3D exemplified the operation of sub-network 400 in this extreme condition with a pre-scribed value for the attenuator, on a normalized basis, of 0.75 (rather than 1.0) and, moreover, covered the various other operating alternatives of: steady-state operation (up to Toff); loss of power (Toff to Ton); and recovery after loss of power to re-capture steady-state (time greater than Ton).

It is readily contemplated that other equivalent arrangements are possible to carry out the functionality of the inventive subject matter. For example, it is possible to use the output from attenuator 420 as a measure of the optical signal power, so that in FIG. 4, fiber tap 410 may be placed after attenuator 420—this arrangement is characterized as "feedback" measurement, as contrasted to the former arrangement of to "feedforward" measurement.

Also, the signal processing by processor 440 may be effected in hardware to realize process flow diagram 500 of FIG. 5.

Finally, even though flow diagram 500 depicts processing as occurring in discrete steps, it is clear that such processing is being carried out continuously. Consider, for example, the "lost power" case: since Vt is being measured continuously, as soon as power is restored, the test by block 520 immediately invokes processing by block 540.

Although various embodiments which incorporate the teachings of the present invention have been shown and described in detail herein, those skilled in the art can readily devise many other varied embodiments that still incorporate these teachings.

What is claimed is:

1. A method for controlling an optical attenuator disposed in optical path propagating an optical signal, the attenuator having a range of settings including a minimum attenuation, the method comprising the steps of measuring energy in the optical signal at an input to the attenuator, and setting the attenuator to a pre-selected value whenever the energy is below a pre-determined threshold indicative no optical signal, the pre-selected value being less than the minimum attenuation.

2. The method as recited in claim 1 wherein the step of setting includes the step of setting the attenuator with reference to prescribed parameters whenever the energy exceeds the pre-determined threshold.

3. The method as recited in claim 1 wherein the step of setting includes the step of setting the attenuator with reference to prescribed parameters whenever the energy changes to a level exceeding the pre-determined threshold.

4. A method for controlling an optical attenuator disposed in optical path propagating an optical signal, the attenuator having a range of settings including a minimum attenuation, the method comprising the steps of measuring energy in the optical signal at an input to the attenuator, if the energy is below a pre-determined threshold, setting the attenuator to a pre-selected value indicative no optical signal, the pre-selected value being less than the minimum attenuation, and if the energy exceeds the pre-determined threshold, operating the attenuator with reference to prescribed parameters.

5. The method as recited in claim 4 wherein the step of operating includes the step of operating the attenuator with reference to the prescribed parameters if the energy is initially below the pre-determined threshold and changes to a level exceeding the pre-determined threshold.

6. A method for controlling an optical attenuator disposed in optical path propagating an optical signal, the attenuator having a range of settings including a minimum attenuation, the method comprising the steps of measuring energy in the optical signal at an output of the attenuator, and setting the attenuator to a pre-selected value whenever the energy is below a pre-determined threshold indicative no optical signal, the pre-selected value being less than the minimum attenuation.

7. The method as recited in claim 6 wherein the step of setting includes the step of setting the attenuator with reference to prescribed parameters whenever the energy exceeds the pre-determined threshold.

8. The method as recited in claim 6 wherein the step of setting includes the step of setting the attenuator with reference to prescribed parameters whenever the energy changes to a level exceeding the pre-determined threshold.

9. A method for controlling an optical attenuator disposed in optical path propagating an optical signal, the attenuator having a range of settings including a minimum attenuation, the method comprising the steps of measuring energy in the optical signal at an output of the attenuator, if the energy is below a pre-determined threshold, setting the attenuator to a pre-selected value indicative no optical signal, the pre-selected value being less than the minimum attenuation, and if the energy exceeds the pre-determined threshold, operating the attenuator with reference to prescribed parameters.

10. The method as recited in claim 9 wherein the step of operating includes the step of operating the attenuator with reference to the prescribed parameters if the energy is initially below the pre-determined threshold and changes to a level exceeding the pre-determined threshold.

11. A method for controlling an optical attenuator disposed in optical path propagating an optical signal, the attenuator having a range of settings including a minimum attenuation, the method comprising the steps of measuring energy in the optical signal at the attenuator, and setting the attenuator to a pre-selected value whenever the energy is below a pre-determined threshold indicative no optical signal, the pre-selected value being less than the minimum attenuation.

12. Circuitry for controlling an optical attenuator disposed in optical path propagating an optical signal, the attenuator having a range of settings including a minimum attenuation, the circuitry comprising means for measuring energy in the optical signal at the input to the attenuator, and means, responsive to the means for measuring, for setting the attenuator to a pre-selected value whenever the energy is below a pre-determined threshold indicative no optical signal, the pre-selected value being less than the minimum attenuation.

13. The circuitry as recited in claim 12 wherein the means for setting further includes means for setting the attenuator with reference to prescribed parameters whenever the energy exceeds the pre-determined threshold.

14. The circuitry as recited in claim 12 wherein the means for setting includes means for setting the attenuator with reference to prescribed parameters whenever the energy changes to a level exceeding the pre-determined threshold.

15. Circuitry for controlling an optical attenuator disposed in optical path propagating an optical signal, the attenuator having a range of settings including a minimum attenuation, the circuitry comprising means for measuring energy in the optical signal at an input to the attenuator, and means, responsive to the means for measuring, for setting the attenuator to a pre-selected value if the energy is below a pre-determined threshold indicative no optical signal, the pre-selected value being less than the minimum attenuation, and for setting the attenuator with reference to prescribed parameters if the energy exceeds the pre-determined threshold.

16. Circuitry as recited in claim 15 wherein the means for setting includes the step of setting the attenuator with reference to the prescribed parameters if the energy is initially below the pre-determined threshold and changes to a level exceeding the pre-determined threshold.

17. Circuitry for controlling an optical attenuator disposed in optical path propagating an optical signal, the attenuator having a range of settings including a minimum attenuation, the circuitry comprising means for measuring energy in the optical signal at the output of the attenuator, and means, responsive to the means for measuring, for setting the attenuator to a pre-selected value whenever the energy is below a pre-determined threshold indicative no optical signal, the pre-selected value being less than the minimum attenuation.

18. The circuitry as recited in claim 17 wherein means for setting includes means for setting the attenuator with reference to prescribed parameters whenever the energy exceeds the pre-determined threshold.

19. The circuitry as recited in claim 17 wherein the means for setting includes means for setting the attenuator with reference to prescribed parameters whenever the energy changes to a level exceeding the pre-determined threshold.

20. Circuitry for controlling an optical attenuator disposed in optical path propagating an optical signal, the attenuator having a range of settings including a minimum attenuation, the circuitry comprising means for measuring energy in the optical signal at an output of the attenuator, and means, responsive to the means for measuring, for setting the attenuator to a pre-selected value if the energy is below a pre-determined threshold indicative no optical signal, the pre-selected value being less than the minimum attenuation, and for setting the attenuator with reference to prescribed parameters if the energy exceeds the pre-determined threshold.

21. The circuitry as recited in claim 20 wherein means for setting includes means for setting the attenuator with reference to the prescribed parameters if the energy is initially below the pre-determined threshold and changes to a level exceeding the pre-determined threshold.

22. Circuitry for controlling an optical attenuator disposed in optical path propagating an optical signal, the attenuator having a range of settings including a minimum attenuation, the circuitry comprising a detector for detecting energy in the optical signal at an input to the attenuator, and a signal processor, responsive to the detector, for setting the attenuator to a pre-selected value whenever the energy is below a pre-determined threshold indicative no optical signal, the pre-selected value being less than the minimum attenuation.

23. Circuitry for controlling an optical attenuator disposed in optical path propagating an optical signal, the attenuator having a range of settings including a minimum attenuation, the circuitry comprising a converter for detecting energy in the optical signal at an output of the attenuator, and a signal processor, responsive to the converter, for setting the attenuator to a pre-selected value whenever the energy is below a pre-determined threshold indicative no optical signal, the pre-selected value being less than the minimum attenuation.

24. Circuitry for controlling an optical attenuator disposed in optical path propagating an optical signal, the attenuator having a range of settings including a minimum attenuation, the circuitry comprising a detector for detecting energy in the optical signal at the attenuator, and a signal processor, responsive to the detector, for setting the attenuator to a pre-selected value whenever the energy is below a pre-determined threshold indicative no optical signal, the pre-selected value being less than the minimum attenuation.

* * * * *